United States Patent
Snyder

[15] 3,658,050
[45] Apr. 25, 1972

[54] ELECTRIC OVEN TOASTER DOOR OPERATING MECHANISM

[72] Inventor: Paul V. Snyder, Whitehall, Pa.
[73] Assignee: General Electric Company
[22] Filed: Nov. 19, 1970
[21] Appl. No.: 90,903

[52] U.S. Cl. .............................. 126/340, 99/334
[51] Int. Cl. ........................................ F24c 15/16
[58] Field of Search ............ 126/335, 340; 99/334, 335; 219/413

[56] References Cited

UNITED STATES PATENTS 2,125,989  8/1938  Burch ..................... 126/340
3,086,511  4/1963  Loch ...................... 126/335
3,119,000  1/1964  Loch et al. ............. 219/413

Primary Examiner—Charles J. Myhre
Attorney—Lawrence R. Kempton, Leonard J. Platt, John F. Cullen, Frank L. Neuhauser, Oscar B. Waddell and Joseph B. Forman

[57] ABSTRACT

An electric oven toaster construction wherein a spring loaded door stop mechanism is provided for permitting a toaster oven door to be automatically partially opened at the end of a cooking cycle, and wherein the door stop mechanism also permits full manual opening of the door against the force of a spring.

5 Claims, 5 Drawing Figures

PATENTED APR 25 1972

Inventor:
Paul V. Snyder
by
Leonard J. Platt
Attorney

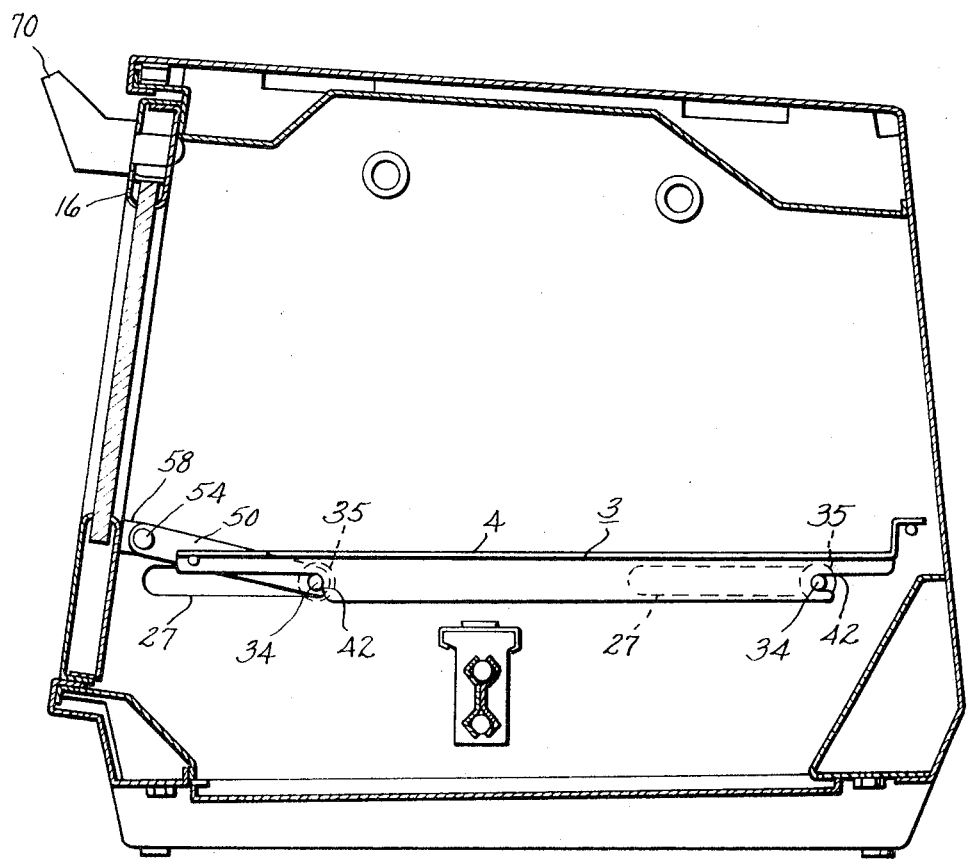

ELECTRIC OVEN TOASTER DOOR OPERATING MECHANISM

BACKGROUND OF THE INVENTION

This invention relates to an electric oven toaster of the type which may be used to toast bread or cook convenience foods such as frozen pizzas and TV dinners, and more particularly, to a door operating mechanism of such an oven toaster.

In a prior U.S. Pat. No. 3,086,511 to J. F. Loch, assigned to the same assignee as the present invention, there is disclosed a mechanism for automatically opening a door of such an oven toaster at the end of a cooking cycle. As shown in the patent, the cooking chamber has a front opening, and a door for the front opening is mounted on arms pivotally supported on the walls of the chamber. The door is opened and lifted upwardly above the front opening at the end of a cooking cycle. A horizontal food supporting rack is mounted in the cooking chamber on generally vertical links which are mounted so that the rack can be moved forwardly through the door opening. The door supporting arms and the rack supporting links are interconnected by an arrangement which causes the rack to move forwardly through the door opening as the door opens.

In other prior art constructions, a front door for such an oven toaster is pivotally mounted at the lower portion of the oven toaster so that it can be opened by moving the top portion of the door away from the oven toaster to pivot the door about its lower hinges until the door is moved to its full opened generally horizontal position. In the other prior art constructions with a door pivotally mounted at the lower portion of the toaster oven, levers are conventionally fixed to the lower portion of the door for cooperation with a horizontally movable food supporting rack. With such a construction, the levers move the food supporting rack forwardly as the door is opened.

This invention is concerned with such oven toaster constructions, and more particularly to a door operating mechanism which will permit a toaster oven door to be partially opened at the end of the cooking cycle.

Correspondingly, it is a primary object of this invention to provide a reliable and effective door operating mechanism for such an oven toaster which will function to permit an oven door to be automatically partially opened at the end of a cooking cycle, and which may be further manually operated to completely open the door to its generally horizontal position.

SUMMARY OF THE INVENTION

In accordance with one of the aspects of this invention, an electric oven toaster is provided with two generally vertical side walls, a generally horizontal top wall and a front opening. A door is pivotally mounted to the lower portion of each of the side walls for selectively closing the front opening of the oven toaster. A carriage is operably connected to the door and is mounted for movement to open or close the door. A timer mechanism is positioned in the electric oven toaster for moving the carriage forwardly at the end of a cooking cycle to partially open the oven toaster door, and a spring loaded door stop mechanism is arranged in operable engagement with the carriage for preventing the door from being automatically opened beyond a predetermined position at the end of a cooking cycle while permitting the door to be manually opened against the force of the spring loaded door stop mechanism. The spring loaded door stop mechanism is strong enough to hold the door in a vertical position against the force of gravity, but weak enough to permit the door to be readily opened manually against the spring force.

By this arrangement, an oven toaster door which is pivotally mounted at its lower portion may be partially opened at the end of a cooking cycle to exhaust hot cooking air from the oven toaster to thereby terminate cooking of any food located within the toaster. However, the door is prevented from automatically falling to its full opened position at the end of the cooking cycle, to thereby prevent the door from hitting any obstruction which might be temporarily placed in front of the toaster.

BRIEF DESCRIPTION OF THE DRAWINGS

Other objects and attendant advantages of the invention will be apparent from the following description taken in connection with the accompanying drawing in which:

FIG. 5 is a cross-sectional view of the electric oven toaster taken substantially on the plane of 5—5 of FIG. 1.

DESCRIPTION OF THE PREFERRED EMBODIMENT

Figure 1:
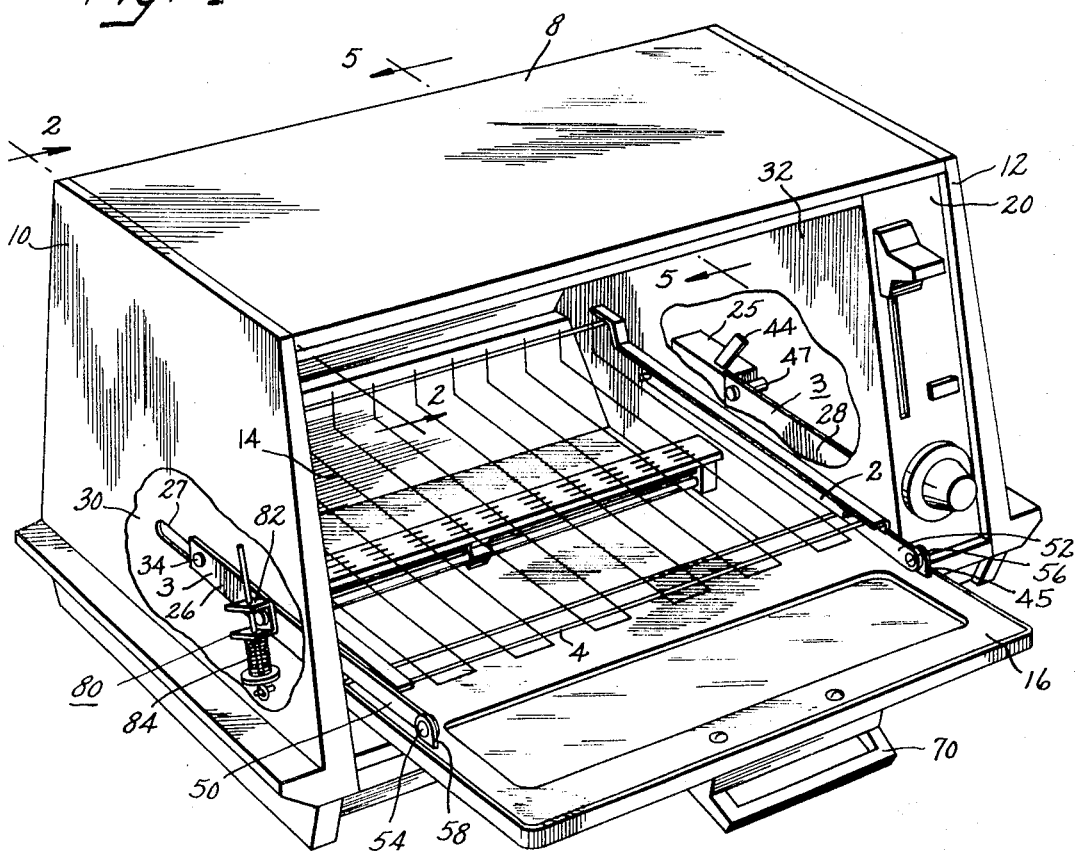
FIG. 1 is a perspective view of an electric oven toaster construction embodying my invention partially broken away to show details of construction.

Referring now to the drawing and first particularly to FIG. 1, there is shown an electric oven toaster which includes a toasting and oven chamber 2 in which is mounted a generally horizontal carriage 3 for supporting a food rack 4 for holding food to be cooked or bread to be toasted. The oven toaster includes a generally horizontal top wall 8, generally parallel vertical side walls 10 and 12, and a front opening 14 to provide access to the inside of the toaster oven.

Figure 2:
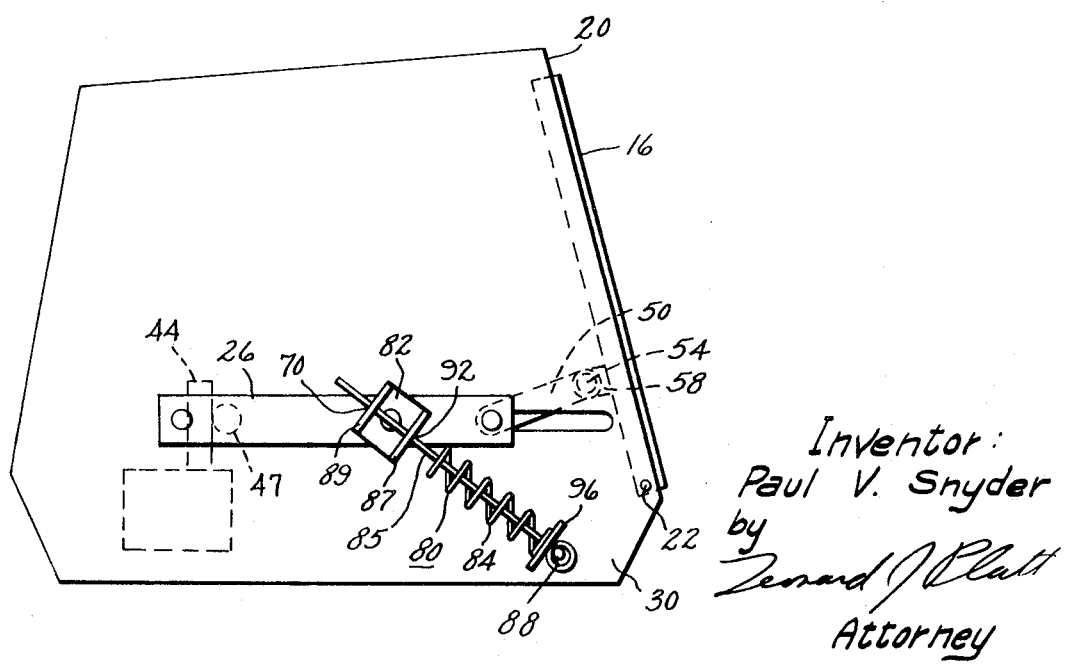
FIG. 2 is a cross-sectional view of the electric oven toaster shown in FIG. 1 taken substantially on the plane of 2—2 of FIG. 1 showing the toaster oven door in its closed position.

A front door 16 is provided for closing the front opening 14. The door 16 includes two outwardly projecting pivot pins 22 for pivoting the door to the lower portion of the toaster oven, and as shown in FIG. 1, the door 16 is in its generally horizontal full open position. As shown in FIG. 2, the front wall 20 of the toaster is slanted slightly to the rear so that the front door 16 is in a somewhat rearward vertical position when it is fully closed, the door being tilted slightly so that the top of the door is somewhat to the rear of the lower portion of the door. Thus, the force of gravity will hold the door in its closed position.

The food rack 4 is arranged to be moved partially through the front opening 14 of the toaster oven when the door is moved to its full open position as shown in FIG. 1. To achieve this in a conventional manner, the carriage 3 for supporting its food rack 4 includes two carriage links 26 and 28 which are mounted for slidable movement in a forward or rearward direction in the oven toaster. As shown in FIG. 5, a pair of slots 27 is formed in each of the sheet metal side plates 30 and 32 of the oven toaster, and outwardly projecting support pins 34 are inserted through the slots 27 and riveted or otherwise secured to the carriage links 26 and 28 to slidably support the carriage links 26 and 28 within the slots 27. It can be seen that each of the pins 34 includes a head portion 35 which has a diameter slightly larger than the width of the slots 27 in which the pins are positioned, and thus, after having been assembled to the carriage links 26 and 28, outward movement of the carriage links 26 and 28 is prevented by the engagement of the head portions 35 of the pins 34 with the inside walls of the panels 30 and 32 in the vicinity slots 27 in which the pins are mounted. With particular reference to FIG. 1, it can be readily seen that the carriage links 26 and 28 have a width which is larger than the width of slots 27, and thus, the carriage links 26 and 28 are prevented from moving through the slots, and their inside surfaces are guided for slidable engagement on the outside surfaces of panels 30 and 32 in the vicinity of slots 27.

The carriage 3 for supporting food to be cooked or bread to be toasted includes the food rack 4 which is removably positioned on the carriage pins 34. As shown more particularly in FIGS. 1 and 5, the left and right side portions of the food rack 4 includes slots 42 for connecting the sides of the food rack to the inwardly projecting pins 34.

The front door 16 of the oven toaster is linked to the carriage 3 so that movement of the carriage 3 in a forward direction will result in opening the front door, and correspondingly pivotal movement of the front door in a door opening direction will result in forward movement of the carriage 3 including the food rack 4 through the front opening 4 of the oven toaster. To achieve this, two door links 50 and 52 are conveniently pivoted to the front door and to the forward pins 34 on the carriage links 26 and 28. Preferably, the door links are permanently pivoted to the front door by means of rivets 54 and 56 which extend through rewardly upwardly extending tabs 58 and 60 which are formed on the front door and suitable pivot bearing apertures which are formed in the forward portion of the door links 50 and 52. The rear portions of the door links 50 and 52 are provided with enlarged pivot apertures 57 so that the door links 50 and 52 may be removably pivoted to the forward pins 34 of the carriage by simply passing the pivot apertures 57 over the respective pins 34. With this construction, it can be appreciated that when the door 16 is manually opened by pulling on its front handle 70, the door will swing downwardly, abut its pivots 22, and during this movement the door links 50 and 52 will pull outwardly on the pins 34 to slide the carriage 3 including links 26 and 28 and the food rack 4 out of the front 14 opening in the toaster. It can be also appreciated that should one or both of the carriage links 26 and 28 be moved forwardly from the closed door position illustrated in FIG. 2, such movement of the carriage links will cause the door links 50 and 52 to be pushed forwardly to open the front door 16.

As shown more particularly in FIG. 1, a timer 25 is provided for cooperating with carriage link 28 in order to open the front door 16 at a predetermined time at the end of a cooking cycle. The timer 25 may include any suitable form of electric toaster timer which includes an output shaft or lever 44 which may be automatically moved from a closed door position shown in FIG. 2, a short distance to an open door position shown in FIG. 3 at the end of a cooking cycle. In order to enable the output lever 44 of the timer to move the carriage link 28 forwardly at the end of a cooking cycle, an abutment 47 may be riveted or otherwise suitably connected to the carriage link 28. As shown more particularly in FIG. 5, the abutment 47 on the carriage link 28 is positioned somewhat forwardly of the upwardly extending lever 44 of the timer so that the forward surface of the timer lever 44 will engage the rear surface of the abutment member 47 when the timer lever 44 is moved from its closed door position shown in FIG. 2 to its open door position illustrated in FIG. 5. With this construction, it can be appreciated that at the end of the toasting or cooking time interval the timer lever 44 moves forwardly to move the carriage link 28 and the carriage 3 forwardly. Naturally, this forward movement of the carriage pushes the door links 50 and 52 forwardly to move the door from the position illustrated in FIG. 2 over its vertical position on pivot pins 22 to open the door at the end of a cooking cycle to thereby exhaust hot cooking air from the toaster to thereby terminate cooking of any food located within the toaster.

In accordance with my invention, a unique arrangement is provided for preventing the door 16 from falling to its full open position shown in FIG. 1 at the end of a cooking cycle to thereby prevent the door from hitting any obstruction which might be temporarily placed in front of the toaster. As shown more particularly in FIG. 3, a spring door stop mechanism 80 is connected to the carriage link 26 for preventing the carriage 3 and door 16 from being moved under the force of gravity beyond the position illustrated in FIG. 3. The door stop mechanism includes a generally "U" shaped bracket 82 which is loosely pivoted to the outer portion of link 26 for cooperating with a spring 84 which functions as an abutment stop. As shown, a rod 85 is provided for spacing the bracket 82 from one end of the spring 84. The rod 85 includes an eye 86 at one of its end and is pivoted to a post 88 which may be fixed to a lower forward portion of side plate 30. Two apertures 70 and 92 may be formed in the outwardly extending sides 87 and 89 of the bracket for receiving the other end of the rod 85. With this arrangement, the spring 84 is positioned on the rod 85 between an abutment 96 formed at the eye end of the rod 85 and the abutment which is formed by the outwardly extending arm 87 of the bracket.

Figure 3:
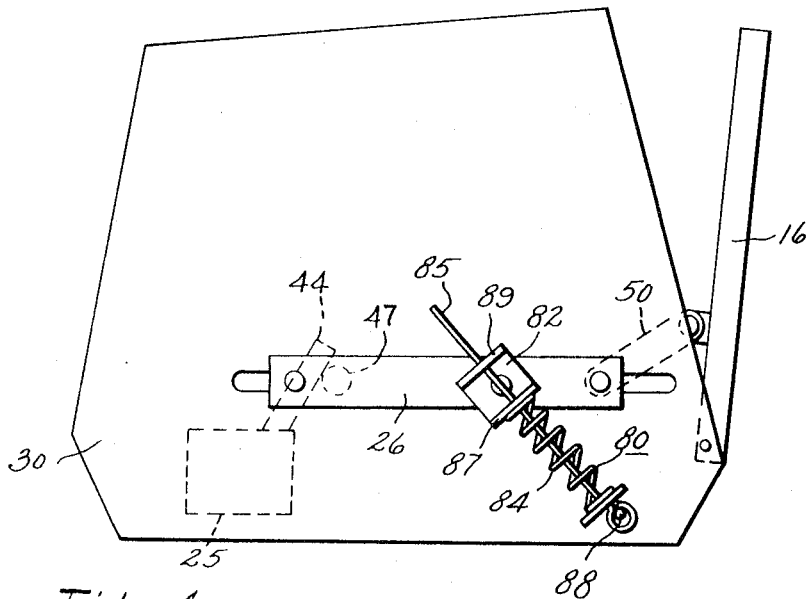
FIG. 3 is a cross-sectional view of the electric oven toaster similar to FIG. 2 showing the toaster oven door in its partially opened position.

With particular reference to FIG. 2, it can be seen that when the door is in its closed position the upper portion of the spring 84 is spaced from the abutment 87 of the bracket so that a lost motion is provided when the door is moved from its door closed position to its FIG. 3 position wherein the door is positioned slightly beyond its vertical position. Accordingly, when the timer 25 partially opens the door and the door starts to fall to its opened position under the force of gravity, the abutment 87 will contact the upper portion of spring 84 to prevent any further movement of the door in a door opening direction. Thus, in accordance with my invention, the spring 84 is designed to be strong enough so that it will hold the door in its partially opened position illustrated in FIG. 3 after it has been opened by the timer 25.

Figure 4:
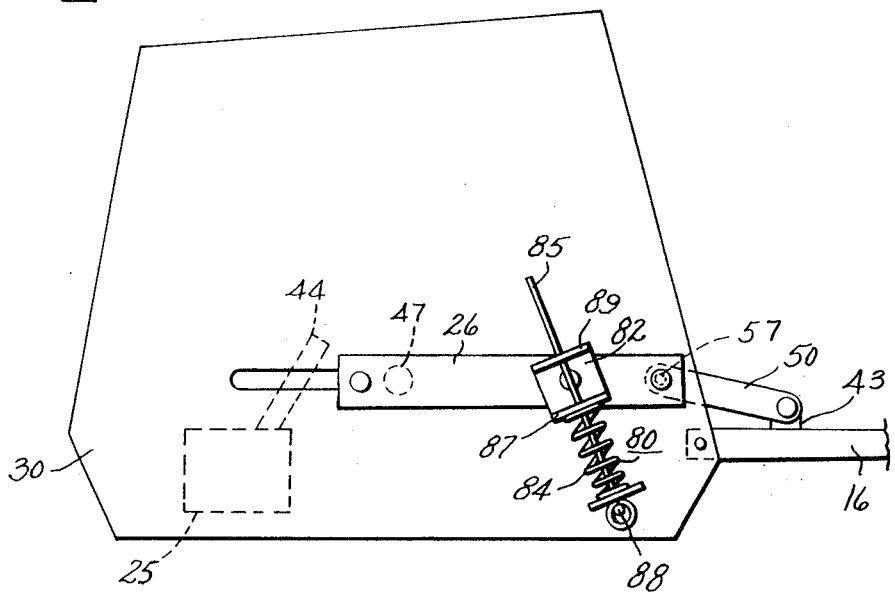
FIG. 4 is a cross-sectional view of the electric oven toaster similar to FIG. 2 showing the toaster oven door in its fully opened position.

The spring 84 is also designed to be weak enough so that the door may be manually opened at any time by exerting a slight force on handle 70. It can be seen that upon the application of manual force in a door opening direction the door links 50 and 52 will pull the carriage 3 forwardly to compress spring 84 until the door has been moved to its full opened position illustrated in FIGS. 1 and 4. In this position, it can be seen that the force of the spring is not so much rearwardly in a door closing direction, but upwardly tending to move the pins 34 of the carriage 3 into frictional engagement with the edges of the side panel 30 in the vicinity of slots 27. Accordingly, with this arrangement, the rearward component of spring force is not strong enough to move the carriage rearwardly and the door remains in its full opened position as illustrated in FIGS. 1 and 4.

From the foregoing description, it will be appreciated that I have provided a unique door operating mechanism for an oven toaster for permitting a toaster oven door to be automatically operated to a partially opened position at the end of a cooking cycle while permitting the door to be readily manually opened or closed at any time.

The lost motion door stop mechanism includes a minimum number of readily manufactured parts which may be easily assembled into a toaster oven. All that is required is a bracket which may be pivotally mounted on a toaster carriage link 26 along with a spring 84 and a guide rod. Thus, an exceedingly simple, yet reliable spring door stop mechanism for an electric oven toaster has been achieved.

I claim:

1. An electric oven toaster construction having two generally vertical side walls, a generally horizontal top wall and a front opening comprising:
   a. a door pivotally mounted to the lower portion of each of the side walls for selectively opening or closing the front opening of the oven toaster;
   b. a carriage operably connected to said door and mounted for movement to open or close the door;
   c. a timing device operatively positioned with respect to said carriage for automatically moving the carriage to open the door at the end of a cooking cycle;
   d. a spring door stop mechanism for preventing the door from falling under the force of gravity beyond a predetermined position after being automatically opened by the timing device; and
   e. manual means connected to the door for permitting the door to be manually opened to its full open position, said spring being weak enough to permit the door to be readily opened manually against the force of the spring.

2. An electric oven toaster construction as defined in claim 1 wherein the carriage includes two carriage links slidably positioned at opposite sides of the toaster oven and a food rack positioned on the carriage links, the timing device is operably positioned with respect to one of the links, and the spring door stop mechanism is operably positioned with respect to the other carriage link.

3. An electric oven toaster construction as defined in claim 1 wherein the spring mechanism for preventing the door from falling under the force gravity beyond a predetermined position includes a spring and abutment which are moved into operative engagement with each other and one of the carriage links when the door is moved to its partially opened position.

4. An electric oven toaster construction as defined in claim 1 wherein said spring door stop mechanism includes a bracket abutment pivotally mounted on one of the carriage links, a guide rod extending through said bracket, and a spring positioned on said guide rod and spaced from said bracket abutment when the door is in its closed position.

5. An electric oven toaster construction having two generally vertical side walls, a generally horizontal top wall and a front opening comprising:
  a. a door pivotally mounted to the lower portion of each of the side walls for selectively opening or closing the front opening of the oven toaster;
  b. a carriage operably connected to said door and mounted for movement to open or close the door;
  c. a timing device operatively positioned with respect to said carriage for automatically moving the carriage to open the door at the end of a cooking cycle;
  d. a spring door stop mechanism for preventing the door from falling under the force of gravity beyond a pre-determined position after being automatically opened by the timing device, including an abutment member and a spring positioned with respect to each other so that the carriage has a pre-determined amount of lost motion in a door opening direction before the spring is operatively engaged with the abutment whereby the abutment member and the force of the spring are sufficient to hold the door in a partially opened position against the force of gravity when the carriage is operated by the timer to partially open the door at the end of the cooking cycle; and
  e. manual means connected to the door for permitting the door to be manually opened to its full open position, said spring being weak enough to permit the door to be readily opened manually against the force of the spring.

* * * * *